United States Patent [19]
Kinney et al.

[11] Patent Number: 6,057,400
[45] Date of Patent: May 2, 2000

[54] WATERBORNE BASECOAT COMPOSITIONS FOR USE IN BASECOAT/CLEARCOAT APPLICATIONS

[75] Inventors: Layton F. Kinney, Chicago; Sharon K. Golas, Glenwood, both of Ill.

[73] Assignee: The Sherwin-Williams Company, Cleveland, Ohio

[21] Appl. No.: 08/973,724

[22] PCT Filed: Jun. 6, 1996

[86] PCT No.: PCT/US96/09519

§ 371 Date: Dec. 23, 1998

§ 102(e) Date: Dec. 23, 1998

[87] PCT Pub. No.: WO96/40511

PCT Pub. Date: Dec. 19, 1996

[51] Int. Cl.[7] ............... C08J 3/00; C08K 3/20; C08L 75/00; B32B 27/00

[52] U.S. Cl. ......... 524/591; 427/258; 427/372.2; 427/385.5; 427/407.1; 428/423.1; 428/423.3; 428/423.4; 524/507; 524/508; 524/510; 524/589; 524/839; 524/840; 525/123; 525/127; 525/453; 525/454; 525/455

[58] Field of Search .............. 427/258, 372.2, 427/385.5, 407.1; 428/423.1, 423.3, 423.4; 524/507, 508, 510, 589, 591, 839, 840; 525/123, 127, 453, 454, 455

[56] References Cited

U.S. PATENT DOCUMENTS

| | | |
|---|---|---|
| 4,377,661 | 3/1983 | Wright et al. ................ 524/522 |
| 4,403,003 | 9/1983 | Backhouse ................ 427/407.1 |
| 4,489,135 | 12/1984 | Drexler et al. ............. 428/423.1 |
| 4,558,090 | 12/1985 | Drexler et al. .............. 524/591 |
| 4,644,030 | 2/1987 | LoewrigKeit et al. ........ 524/457 |
| 4,719,132 | 1/1988 | Porter, Jr. ................. 427/409 |
| 4,822,685 | 4/1989 | Perez et al. .............. 428/423.3 |
| 4,880,867 | 11/1989 | Gobel et al. ............... 524/507 |
| 4,954,559 | 9/1990 | Den Hartog et al. ........ 524/507 |
| 4,978,708 | 12/1990 | Fowler et al. .............. 524/507 |
| 5,006,413 | 4/1991 | Den Hartog et al. ........ 428/463 |
| 5,017,673 | 5/1991 | Balatan .................... 528/59 |
| 5,051,464 | 9/1991 | Johnson et al. ............ 524/555 |
| 5,066,732 | 11/1991 | Savino et al. ............. 525/440 |
| 5,100,735 | 3/1992 | Chang ..................... 428/515 |
| 5,157,069 | 10/1992 | Campbell .................. 524/500 |
| 5,169,719 | 12/1992 | Balatan ................... 428/423.1 |
| 5,204,401 | 4/1993 | Anderson, Jr. et al. ...... 524/441 |
| 5,204,404 | 4/1993 | Werner, Jr. et al. ........ 524/501 |
| 5,286,569 | 2/1994 | Werner, Jr. et al. ........ 428/423.1 |
| 5,314,945 | 5/1994 | Nickle et al. .............. 524/507 |
| 5,342,882 | 8/1994 | Göbel et al. ............... 524/832 |

OTHER PUBLICATIONS

NeoRez R–966, ICI Resins US, p. 1–4, Bulletin R–966–B.

*Primary Examiner*—Patrick D. Niland
*Attorney, Agent, or Firm*—Robert E. McDonald; Vivien Y. Tsang; Heidi A. Boehlefeld

[57] ABSTRACT

Compositions containing polyurethane dispersions and water reducible resins particularly suited for use as basecoats in low VOC basecoat/clearcoat vehicle coatings.

12 Claims, No Drawings

WATERBORNE BASECOAT COMPOSITIONS FOR USE IN BASECOAT/CLEARCOAT APPLICATIONS

BACKGROUND OF THE INVENTION

The present invention relates to waterborne basecoat compositions having particular utility in multi-layer coatings such as vehicle basecoat/clearcoat (BC/CC) applications. The basecoat compositions of this invention can be used in either original equipment manufacturer (OEM) production lines or in automotive vehicle refinish (VR) body shops and the like.

Multi-layer coatings for use over the surface of automobiles, trucks and the like have been in use for years. Originally, such coating systems used organic solvents. As environmental concerns and regulations became more prevalent, such organic solvent-based systems fell out of favor. In recent years, the development of waterborne systems has increased. In particular, the development of waterborne basecoats as part of a volatile organic content (VOC) compliant basecoat/clearcoat system has increased. Many of the world's large coatings companies have disclosed waterborne basecoats for use in basecoat/clearcoat vehicle coatings. By way of example, BASF, DuPont, ICI and PPG all have patents in this area: U.S. Pat. No. 5,204,401 (Anderson et al., BASF) teaches metallic and nonmetallic waterborne basecoats having a water-reducible acrylic resin with nonionic and acid functionality derived from vinyl monomers having nonionic and urethane functionality. U.S. Pat. No. 5,169,719 (Balatan BASF) teaches water-dilutable polyurethane/acrylic copolymers useful as the principal resin and as pigment grind resins in waterborne automotive basecoats. U.S. Pat. No. 5,157,069 (Campbell, BASF) teaches an aqueous coating comprising a nonionic dispersion of a polymer selected from the group consisting of acrylic resin, polyurethane resin (and mixtures thereof) with a nonionic water soluble rheology control polymer (such as a polyether, cellulose, cellulose derivative, polyvinylalcohol, etc.) and pigments. U.S. Pat. No. 5,066,732 (Savino et al., BASF) teaches water dispersible nonionic polyurethane resins having polyether backbones. U.S. Pat. No. 5,017,673 (Balatan, BASF) teaches water dispersible nonionic polyurethane resins having polyester backbones. U.S. Pat. No. 4,978,708 (Fowler et al., BASF) teaches an aqueous basecoat containing an anionic polyurethane resin and an anionic acrylic pigment grind resin. U.S. Pat. Nos. 4,558,090 and 4,489,135 (Drexler et al., BASF) teach a process and composition useful as a basecoat in a multilayer coating wherein the basecoat is an aqueous polyurethane. U.S. Pat. No. 5,204,404 (Werner Jr., et al., DuPont) teaches waterbased coating compositions containing an acrylic silane polymer and a polyurethane polymer. U.S. Pat. No. 5,051,464 (Johnson et al., DuPont) teaches a waterbased coating composition containing an acrylourethane pigment dispersing polymer and a binder. U.S. Pat. Nos. 5,006,413 and 4,954,559 (Den Hartog et al., DuPont) teach waterbased coating compositions containing a methylol (meth) acrylamide acrylic polymer binder and a polyurethane. U.S. Pat. No. 5,100,735 (Chang, DuPont) teaches an improved process for forming a multilayer finish on an automobile comprising using a waterborne acrylic basecoat and a high solids, solvent-based acrylic, polyester, or polyesterurethane clearcoat with an alkylated melamine formaldehyde crosslinking agent. U.S. Pat. No. 4,403,003 (Backhouse, ICI) teaches a process for producing a multilayer coating wherein an aqueous dispersion pigmented basecoat containing crosslinked microparticles is first applied. U.S. Pat. No. 4,822,685 (Perez et al., PPG) teaches a method of forming a multilayer coating over a substrate wherein an aqueous-based polyurethane dispersion is used as a pigmented basecoat. U.S. Pat. No. 4,719,132 (Porter Jr., BASF) teaches an aqueous basecoat comprising an aqueous polyurethane resin.

SUMMARY OF THE INVENTION

The present invention relates to a waterborne basecoat composition which, together with an appropriate clearcoat composition, is particularly useful as a multilayer coating system for use in both OEM and VR applications. The basecoat composition is low in VOC and can be pigmented with a broad range of pigments readily available and used in the automotive industry, including nonmetallic pigments, metallic pigments and other opalescent pigments. It is specifically designed to have good solvent and water resistance. This prevents basecoat attack and degradation by the clearcoat or topcoat and promotes clearcoat gloss and metal stability and orientation for metallic pigments. Yet, the basecoat also remains easy to clean from spraying equipment.

The waterborne basecoat composition of the present invention comprises:

a. water, b. a polyurethane resin dispersible in water, c. one or more resins selected from the group consisting of water-reducible resins and aqueous emulsion polymers, produced by a free-radical addition polymerization reaction, and d. pigment.

In a preferred embodiment, the waterborne basecoat composition of the present invention is obtained by mixing two main components prior to application to the substrate:

a. one or more pigmented toner resin components, and b. a mixing clear resin component.

In such an embodiment, each pigmented toner resin component comprises water, a resin or polymer and pigmentation for the basecoat. It should be appreciated that many of today's popular basecoat colors are the result of a combination of two or more pigmented toner resins. Each toner resin comprises one or more resins or polymers selected from the group consisting of i) polyurethane resins dispersible in water, ii) water-reducible resins and aqueous emulsion polymers, produced by a free-radical addition polymerization reaction, and mixtures thereof. Pigments in the toner resin component comprise standard pigments such as titanium dioxide, carbon black, red oxide and the like, opalescent pigments such as micas, and metallic pigments such as aluminums. Generally, such pigments are available in the form of pigment dispersions; however, powdered pigments are also available and useful. The combination of one or more such toner resins provides the OEM painter or the VR refinisher with the desired basecoat color. A method for properly selecting the types of resins to be used in the toner components is taught herein.

In the above-mentioned preferred embodiment, the mixing clear resin component comprises:

a. one or more aqueous emulsion polymers produced by a free-radical addition polymerization reaction (particularly useful in the case of ambient cure, or forced air dry cure systems such as those used in vehicle refinish shops), or b. a polyurethane dispersion resin in combination with a small amount of aqueous emulsion polymer (particularly useful in the case of temperature cured or bake dry systems such as those used in OEM production lines).

Preferred basecoat ingredients are more fully described below. In addition, the criteria for determining the requisite combinations of pigment and resin in each preferred component are described in more detail.

Accordingly, it is an object of this invention to teach a novel waterborne basecoat composition particularly useful in multi-layer basecoat/clearcoat applications.

It is a further object of this invention to teach a multi-layer coated substrate wherein the basecoat layer comprises the novel waterborne basecoat described herein.

It is yet a further object of this invention to teach a process for coating a substrate with a multi-layer coating composition comprising the novel waterborne basecoat described herein.

These and other objects will become more apparent from the detailed description of the invention below.

DETAILED DESCRIPTION OF THE INVENTION

As described briefly above, the present invention relates to a waterborne basecoat composition which, together with an appropriate clearcoat composition, is particularly useful as a multilayer coating system for use in both OEM and VR applications. The basecoat composition is low in VOC and can be pigmented with a broad range of pigments readily available and used in the automotive industry, including nonmetallic pigments, metallic pigments and other opalescent pigments.

The waterborne basecoat composition of the present invention comprises:

a. water,
b. a polyurethane resin dispersible in water,
c. one or more resins selected from the group consisting of water-reducible resins and aqueous emulsion polymers, produced by a free-radical addition polymerization reaction, and
d. pigment.

In a preferred embodiment, the waterborne basecoat composition of the present invention is obtained by mixing two main components prior to application to the substrate:

a. one or more pigmented toner resin components, and
b. a mixing clear resin component.

It should be appreciated that many of today's popular basecoat colors are the result of a combination or mixture of two or more pigmented toner resins. Each such pigmented toner resin component comprises water, a resin or polymer and pigmentation for the basecoat. In the present invention, each toner resin comprises one or more resins selected from the group consisting of i) polyurethane resins dispersible in water, ii) water-reducible resins and aqueous emulsion polymers, produced by a free-radical addition polymerization reaction, and mixtures thereof. Pigments in the toner resin component comprise standard pigments such as titanium dioxide, carbon black, red oxide and the like, opalescent pigments such as micas, and metallic pigments such as aluminums. The mixture of one or more such toner resins, together with the mixing clear component, provides the OEM painter or the VR refinisher with the desired basecoat color. A method for properly selecting the types of resins to be used in the toner components is taught herein.

In the above-mentioned preferred embodiment, the mixing clear resin component comprises:

a. one or more aqueous emulsion polymer resins produced by a free-radical addition polymerization reaction (particularly useful in the case of ambient cure, or forced air dry cure systems such as those used in vehicle refinish shops), or b. a polyurethane dispersion resin in combination with a small amount of aqueous emulsion polymer (particularly useful in the case of temperature cured systems such as those used in OEM production lines).

The detailed discussion below first describes each of the critical ingredients in compositional detail. The discussion then proceeds to describe the preferred combinations of ingredients as well as a recipe for determining which various compositions to use when formulating preferred components. Throughout the detailed discussion, embodiments of this invention are exemplified. It should be appreciated that many different combinations of the critical ingredients may arrive at basecoat compositions which perform suitably. However, it should also be appreciated that not all of such combinations would also exhibit the ancillary (but important) criteria for being considered useful in a commercial setting. For example, one might simply combine each of the critical ingredients in the amounts described herein to arrive at a single basecoat composition that is particularly well suited for a single painting job; however, such composition might not be sufficiently flexible to be stocked at a vehicle refinisher's shop to be used in the broad range of situations that face the refinisher. In such a situation, the preferred embodiments referred to above and in more detail herein have their greatest utility.

Basecoat Compositional Requirements a. Basecoat Resins

The basecoat of the present invention utilizes three basic resins in various combinations. The first resin, which is present in every embodiment of the basecoat, is a water-dispersible polyurethane resin. Preferably, the polyurethane dispersion resin contains no organic solvent and will dry by evaporation of any water used to disperse the resin to yield a tough, flexible film having good abrasion resistance, ultraviolet light stability, water and chemical resistance.

A preferred polyurethane resin is typically a dispersion in water of the reaction product of at least one polyol, preferably selected from the group consisting of:

1) polyols such as the saturated and unsaturated polyhydric alcohols including ethylene glycol, propylene glycol, neopentyl glycol, 1,4-butanediol, 1,4-butenediol, 1,6-hexanediol, furan dimethanol, and cyclohexane dimethanol;

2) polyester polyols formed from the reaction of saturated and unsaturated polyhydric alcohols such as ethylene glycol, propylene glycol, neopentyl glycol, 1,4-butanediol, 1,4-butenediol, 1,6-hexanediol, furan dimethanol, and cyclohexane dimethanol, with saturated and unsaturated polycarboxylic acids and derivatives thereof such as maleic acid, fumaric acid, itaconic acid, succinic acid, glutaric acid, adipic acid, isophthalic acid, terephthalic acid, phthalic anhydride, dimethyl terephthalate, dimer acids and the like;

3) polyesters formed by the reaction of lactones, such as caprolactone, with a polyol;

4) polyether polyols such as the products of the polymerization of a cyclic oxide such as ethylene oxide, propylene oxide or tetrahydrofuran;

5) polyether polyols formed by the addition of one or more cyclic oxides to water, ethylene glycol, propylene glycol, diethylene glycol, cyclohexane dimethanol, glycerol, or Bisphenol A;

6) polycarbonate polyols such as the reaction product of 1,3-propanediol, 1,4-butanediol, 1,6-hexanediol, diethylene glycol or tetraethylene glycol with diaryl carbonates such as diphenyl carbonate or phosgene;

7) polyacetal polyols such as the reaction product of a glycol such as diethylene glycol, triethylene glycol or hexanediol with formaldehyde;

8) polyols such as dihydroxyalkanoic acids including dimethylolpropionic acid;

and mixtures thereof, with an isocyanate composition.

Preferably, the polyols are predominantly di-functional. However, higher-functional alcohols can also be included. The most preferred polyols are a combination of 1) polyether polyols such as the products of the polymerization of a cyclic oxide such as ethylene oxide, propylene oxide or tetrahydrofuran; and 2) a polyol containing hydrophilic groups. A particularly preferred polyol containing hydrophilic groups is dimethylolpropionic acid.

Optionally, and generally present during the reaction is up to about 0.06%, preferably between about 0.01% and about 0.04% (by weight based upon total solids of polyol and isocyanate) of a catalyst such as di-butyl tin dilaurate, tin octoate and the like.

To ensure that the intermediate is dispersible in an aqueous media, generally a percentage of the total polymer weight solids, preferably between about 1% and about 10%, is contributed by polyols (or other compositions having active hydrogen atoms or the ability to react with isocyanates, such as amines or mercaptans) having the ability to contribute ionic or hydrophilic groups to the polyurethane-urea; for example, polyols, amines or mercaptans containing carboxylic acid groups, sulfonic acid groups, phosphoric acid groups, ammonium salts, phosphonium salts or sulfonium salts. Acceptable polyols, amines and the like are described at Column 10, lines 18–69 of U.S. Pat. No. 4,880,867, which portion of said patent is incorporated herein by reference.

In a typical reaction mechanism, the polyol is charged with the catalyst to a reaction vessel, and the contents are heated to a temperature of between about 70° C. and about 100° C., with continuous or stepwise addition over a period of time, preferably between about ½ hour to about 4 hours, of the isocyanate-functional materials.

It should be appreciated that from a chemistry standpoint, organic solvents are acceptably included in the composition. However, this invention relates to low or zero VOC dispersions, and, consequently, inclusion of such solvents in large percentages is considered outside the scope of the invention. Such solvents typically include n-methyl pyrolidinone, dimethyl formamide, methyl ethyl ketone, toluene, and mixtures thereof. After complete addition of the isocyanate materials, the reaction vessel temperature is generally maintained between about 80° C. and 100° C. for so long as necessary to bring the residual isocyanate percentage (based upon the total solids weight of the polymer) below about 8.0%, preferably into a range between about 1.5% to about 6.0%. This takes approximately 2 to 4 hours. Residual isocyanate percentage can be measured by any means well known in the art. The contents are then generally cooled to below about 70° C. and the ionic groups present in the product of the above reaction are then neutralized by the addition of a weak base, such as triethylamine, trimethylamine, triisopropyl amine, tributyl amine, N,N-dimethyl-cyclohexyl amine, N,N-dimethylstearyl amine, N,N-dimethyl aniline, N-methylmorpholine, N-ethylmorpholine, N-methylpiperazine, N-methylpyrolidine, N-methylpiperidine, N,N-dimethyl-ethanol amine, N,N-diethyl-ethanol amine, triethanol amine, N-methyldiethanol amine, dimethylaminopropanol, 2-methoxyethyldimethyl amine, N-hydroxyethylpiperazine, 2-(2-dimethylaminoethoxy)-ethanol and 5-diethylamino-2-pentanone and mixtures thereof. Most preferred neutralization agents are the tertiary amines as they are not reactive with the free isocyanate groups. Particulary preferred is triethylamine. The weak base can be added in excess, that is, an amount greater than that necessary to neutralize the ionic groups; however, too much weak base will cause an unacceptable increase in the VOC of the composition. At a minimum, the amount of weak base added should be sufficient to neutralize at least about 80% of the ionic groups present in solution. Preferably, the weak base is added in an amount sufficient to theoretically neutralize 100% of the ionic groups.

The intermediate is then dispersed in water. The percentage of solids in the water can range up to about 60% by weight, preferably between about 20% to 50% by weight. A difunctional amine compound such as ethylene diamine, propylene diamine, butylene diamine, hexamethylene diamine, cyclohexylene diamine, piperazine, hydrazine, mixtures thereof, equivalents thereof and the like in an amount sufficient to react with up to about 90% of the theoretical amount of residual iocyanate functionality can optionally be included in the dispersing media for chain extension of the polyurethane. Chain extenders having a functionality greater than two should not be included in any appreciable amount due to their tendency to cause unacceptably high levels of branching.

The isocyanate-functional material is selected from materials which are well known in the art and include the mono-, di-, tri- and multi-functional isocyanates. Di- and tri-functional isocyanates are most preferred.

Suitable isocyanate functional materials include aromatic, cycloaliphatic and aliphatic isocyanates such as cyclohexyl isocyanate, phenyl isocyanate, toluene isocyanate, hexamethylene diisocyanate, 4,4'-dicyclohexylmethane diisocyanate, 1,4-tetramethylene diisocyanate, 1,10-decamethylene diisocyanate, toluene-2,4- or 2,6-diisocyanate, 1,5-naphthalene diisocyanate, 4-methoxy-1,3-phenylene diisocyanate, benzene 1,3-bis (1-isocyanato-1-methylethyl), 4-chloro-1,3-phenylene diisocyanate, 2,4'-diisocyanatodiphenyl ether, 5,6-dimethyl-1,3-phenylene diisocyanate, 2,4-dimethyl-1,3-phenylene diisocyanate, 4,4'-diisocyanatodiphenylether, benzidine diisocyanate, 4,4'-diisocyanatodibenzyl, methylene-bis(4-phenyl-isocyanate), 1,3-phenylene diisocyanate, 1,2,4-benzene triisocyanate and polymethylene polyphenyl isocyanate.

Most preferred is isophorone diisocyanate.

Of the commercially available polyurethane dispersions, the NeoRez R-966® polyurethane resin available from Zeneca Resins is particularly preferred. It is a colloidal dispersion of an aliphatic urethane in water. Analysis of this dispersion shows it to comprise the reaction product of isophorone diisocyanate, polytetrahydrofuran (HO—[—(CH$_2$)$_4$—O—]$_n$—H) of molecular weight $M_w$ approximately 1600, and dimethylolpropionic acid.

As discussed above, the basecoat composition also comprises one or more resins or polymers selected from the group consisting of water-reducible resins and aqueous emulsion polymers, produced by a free-radical addition polymerization reaction. It should be appreciated that it is often unclear as to whether a particular resin, when put into water, is a solution or dispersion. For purposes of this invention it is not necessary to determine if a resin is actually a water-reducible solution polymer or an aqueous dispersion provided that such resin meets the compositional requirements described herein.

The monomers useful in preparing either type of resin are generally selected from the group consisting of acrylic and vinyl monomers which would produce a polymer via the free radical addition reaction mechanism. The resultant polymer is either stably insoluble in the aqueous polymerization medium (i.e. a dispersion) or soluble in the aqueous polymerization medium (i.e. a solution polymer). Suitable monomers are selected from the group consisting of acrylonitrile, methacrylonitrile, hydroxy ethyl acrylate and methacrylate, methyl acrylate and methacrylate, hydroxy propyl acrylate and methacrylate, ethyl acrylate and methacrylate, butyl acrylate and methacrylate, lauryl acrylate and methacrylate, trimethylol propane triacrylate and trimethacrylate, hexanediol diacrylate, caprolactone modified hydroxy ethyl acrylate, polyethylene oxide acrylate and methacrylate, polypropylene oxide acrylate and methacrylate, allyl alcohol, acrylamide, methacrylamide, vinyl chloride, vinylidene chloride, acrylic acid, methacrylic acid, itaconic acid, maleic acid, fumaric acid, styrene, divinyl benzene, vinyl naphthalene, vinyl toluene, the methyl esters of itaconic, maleic and fumaric acid, and mixtures thereof.

In addition to pure monomers, preformed polymers, polymeric intermediates, multifunctional epoxides, melamines and isocyanates, can be included in the reactor charge.

One preferred resin (hereinafter referred to as Dispersion Resin #1) is a low molecular weight 65% solids (by weight) water-reducible resin prepared by free-radical addition polymerization in 2-butoxy ethanol using t-butyl peroctoate as initiator of between about 5–15% methyl methacrylate, about 5–15% styrene, about 10–20% butyl acrylate, about 35–45% butyl methacrylate, about 10–20% hydroxy ethyl methacrylate and about 5–10% acrylic acid, all monomer percentages by weight of total monomer added. Acid value is generally between about 40 and about 75, preferably between about 50 and about 65. The techniques used to prepare such suitable resins are wellknown in the art. In general, standard free radical polymerization techniques are acceptable. One such procedure comprises a four hour addition of monomers and free radical addition initiator to a reactor containing solvent at a temperature of between about 100 degrees C. and about 120 degrees C. followed by a 15 minute chase of additional initiator and an additional two hour hold time at the same temperature.

An additional preferred polymer is an aqueous emulsion polymer commercially available from Rohm & Haas under the tradename Rhoplex WL-91™. Rhoplex WL-91 is a thermoplastic acrylic emulsion sold at 41.5% solids by weight in water. This polymer has been analyzed as approximately 50% styrene (by weight of total monomers), approximately 34% 2-ethylhexyl acrylate, approximately 4% acrylic acid and approximately 12% acrylonitrile.

Preferred Embodiments

In a preferred embodiment, the basecoat composition is not merely a mixture of the above-identified ingredients. Rather, it comprises two main components: one or more pigmented toner resin components and a mixing clear resin component. This arrangement is preferred as it gives the painter the flexibility to mix one or more compatible pigmented toners together to formulate to a specific color and use the mixing clear component to adjust the tint strength of the final basecoat. This formulation flexibility is essential in vehicle refinish shops. Each of the preferred embodiment components is described in more detail below.

a. Toners

We have found that because of the differences in standard nonmetallic pigments and the metallic and mica-based pigments, different combinations of resins are useful depending on the pigmentation of the basecoat. For example, if preparing a green flop blue toner using only nonmetallic and non-mica-based pigments, the toner can be prepared by making a grind paste comprising the ingredients in Table 1:

TABLE 1

| Ingredient # | Pounds | Gallons | Description |
|---|---|---|---|
| 1 | 584.4 | 70.4 | Deionized Water |
| 2 | 7.2 | 1.0 | Dimethyl ethanol amine |
| 3 | 141.9 | 16.7 | Dispersion Resin #1 |
| 4 | 183.4 | 12.0 | Blue Pigment |

The procedure for making the grind paste is to premix ingredients #1 through #3 for 20 minutes at low rpm using a high speed disperser. Slowly add ingredient #4 and stir for another 20 minutes. Charge the slurry to a stainless steel ball mill and process for 72 hours to a Hegman grind of 7+. Letdown the grind paste with the letdown formula shown in Table 2:

TABLE 2

| Ingredient # | Pounds | Gallons | Description |
|---|---|---|---|
| 1 | 552.7 | 64.3 | NeoRez R-966 |
| 2 | 275.7 | 30.1 | Grind Paste from Table 1 |
| 3 | 12.3 | 1.5 | Deionized Water |
| 4 | 13.8 | 1.6 | Diethylene glycol methyl ether |
| 5 | 10.5 | 1.2 | Acrysol RM-8 Rheology Modifier |
| 6 | 2.2 | 0.3 | Surfynol ™ 104E Surfactant |
| 7 | 9.4 | 1.1 | Deionized Water |

The letdown procedure is to add ingredient #2 to ingredient #1 slowly with good agitation. Thoroughly mix ingredients #3 through #6 and then add with good agitation.
Add #7 to adjust viscosity to 2400–3600 cps using a Brookfield LVT #3 spindle at 30 rpm.

On the other hand, to prepare a metallic toner, we have found that it is preferred to create an intermediate comprising the ingredients of Table 3:

TABLE 3

| Ingredient # | Pounds | Gallons | Description |
|---|---|---|---|
| 1 | 155.91 | 18.13 | Rhoplex WL-91 Acrylic Emulsion |
| 2 | 486.36 | 58.6 | Deionized Water |
| 3 | 105.56 | 12.27 | NeoRez R-966 |
| 4 | 3.32 | 0.39 | Diethylene glycol methyl ether |
| 5 | 1.13 | 0.12 | Nuosep 95 Biocide |
| 6 | 0.74 | 0.10 | Aqueous Ammonia |
| 7 Modifier* | 41.7 | 5.15 | 8% Acrysol TT615 Rheology |
| 8 | 5.63 | 0.67 | Surfynol 104E Surfactant |
| 9 | 6.56 | 0.75 | Dibutyl phthalate |
| 10 | — | — | Aqueous Ammonia |
| 11 | 31.60 | 3.81 | Deionized Water |

*Acrysol TT615 is a commercially available rheology modifier from Rohm & Haas. It is used here as a solution of 215.75 lbs Acrysol TT615 in a cosolvent blend comprising 135.1 lbs isopropanol, 424.8 lbs diethylene glycol methyl ether, 10.0 lbs aqueous ammonia and 14.55 lbs water.

A preferred procedure comprises mixing ingredients #1 through #3 together at low speed, premixing ingredients #4 through #9 and then mix together with #1–#3 for approximately one hour. Add ingredients #10 and #11 to adjust pH to approximately 8.5 to 9.0 and viscosity to 11000 to 17000 cps using a Brookfield LVT with #3 spindle at 6 rpm.

The intermediate from Table 3 becomes the primary ingredient in formulating the metallic toner according to the sample formula and procedure of Table 4:

TABLE 4

| Ingredient # | Pounds | Gallons | Description |
|---|---|---|---|
| 1 | 629.64 | 75.09 | Intermediate from Table 3 |
| 2 | 28.59 | 3.44 | Deionized Water |
| 3 | 16.70 | 1.94 | Water Reducible Acrylic Resin** |
| 4 | 16.64 | 2.18 | Methoxypropanol |
| 5 | 1.09 | 0.13 | Diethylene glycol methyl ether |
| 6 | 1.51 | 0.25 | Triethylamine (98.5%) |
| 7 | 0.65 | 0.07 | Disperbyk Dispersing Aid |
| 8 paste | 52.96 | 4.07 | Stapa Hydralac W 33NL Aluminum |
| 9 | 10.52 | 1.27 | Deionized Water |
| 10 | 22.38 | 2.70 | Deionized Water |
| 11 | 73.55 | 8.86 | Deionized Water |
| 12 | — | — | Intermediate from Table 3 |

**A graft copolymer of castor oil and acrylic monomers purchased from CCP under the name XR17-B080-83 believed to be produced according to the procedures taught in U.S. Pat. No. 3,808,163, incorporated herein by reference. A preferred procedure for Table 4 is to first mix ingredients #1 and #2 at low speed. In a separate vessel, add #3 through #7 at low speed and then add #8 slowly using good agitation. Mix for about 5 minutes. Add #9 and mix until a Hegman grind of about 6 is achieved then add to the first vessel containing #1 and #2. Add #10 to wash the sides of the second vessel into the first vessel. Add #11 as necessary to adjust viscosity to 1800–3500 cps using a Brookfield LVT #3 spindle at 30 rpm and add #12 to adjust tint strength as desired.

Mica-based toners follow the same procedure used in Table 3; however, the procedure for mixing the mica pigment into the intermediate is generally much simpler than that used with metallics. Table 5 shows one such preferred procedure:

TABLE 5

| Ingredient # | Pounds | Gallons | Description |
|---|---|---|---|
| 1 | 704.03 | 83.96 | Intermediate from Table 3 |
| 2 | 89.95 | 10.84 | Deionized Water |
| 3 | 49.77 | 1.92 | Afflair 9225 Blue Mica Pigment |
| 4 | 27.22 | 3.28 | Deionized Water |
| 5 | — | — | Intermediate from Table 3 |

A preferred procedure for mica-based toners is to mix ingredients #1 and #2 and to sift in ingredient #3. Mix at low speed until a Hegman grind of about 6 is attained. Adjust pH using aqeuous ammonia (14% in water) to a value of 8.0 to 9.0. Add #4 to adjust viscosity to 1800–2700 cps using a Brookfield LVT #3 spindle at 30 rpm and add #5 to adjust tint strength as desired.

Using the recipes outlined above, one can formulate a wide variety of nonmetallic, metallic and mica-based toners. These toners are all compatible with one another and can be mixed together to prepare customized basecoat colors as desired.

b. Mixing Clears

The mixing clears described in more detail below are useful in combination with the toners described above to regulate not only the tint strength of the final basecoat but to impart properties to the basecoat that are particularly suited to the environment under which the basecoat will be applied and dried. For example, different drying characteristics are desired from the basecoat depending on whether the basecoat will be baked dry at elevated temperature or whether the basecoat will be air dried at room temperature. Typical OEM production lines can use elevated temperature drying. However, due to the presence of vehicle parts which can melt or otherwise deform, the typical VR shop must dry the paint layers at much lower temperatures than those used on the original production line. We have found that depending on the end use (OEM or VR), two different mixing clears are preferred.

For vehicle refinish applications where lower temperature drying of the coating is desired, a preferred mixing clear resin component comprises an aqueous acrylic emulsion resin as the main ingredient, preferably the WL-91 resin commercially available from Rohm & Haas. A preferred composition for one such mixing clear is shown in Table 6:

TABLE 6

| Ingredient | Pounds | Gallons | Description |
|---|---|---|---|
| 1 | 298.47 | 35.96 | Deionized Water |
| 2 | 339.99 | 39.53 | WL-91 Acrylic Emulsion |
| 3 | 46.67 | 6.10 | Methoxypropanol |
| 4 | 0.93 | 0.10 | Nuosep 95 Biocide |
| 5 | 6.55 | 0.86 | Surfynol 104BC |
| 6 | 14.38 | 1.65 | Dibutyl phthalate |
| 7 | 1.91 | 0.25 | Aqueous Ammonia |
| 8 Modifier*** | 62.06 | 8.39 | 8% Acrysol TT615 Rheology |
| 9 | — | — | Aqueous Ammonia |
| 10 | 59.39 | 7.16 | Deionized Water |

***Acrysol TT615 is a commercially available rheology modifier from Rohm & Haas. It is used here as a solution of 197.3 lbs Acrysol TT615 in a cosolvent blend comprising 252.5 lbs isopropanol, 259.0 lbs butoxy ethanol, 10.0 lbs aqueous ammonia and 12.3 lbs water.

A preferred procedure for making this mixing clear is to mix #1 and #2 together at low speed. Add ingredients #3 through #8 to #1 and #2 and mix for one hour. Use #9 to adjust pH to 7.5 to 8.5 and use #10 to adjust viscosity to 2500–3500 cps using a Brookfield LVT #3 spindle at 30 rpm.

Unlike the mixing clear preferred for lower temperature drying situations, in bake dry systems we have found that a mixing clear comprising a water-dispersible polyurethane resin such as the NeoRez R-966 resin is preferred. Table 7 demonstrates one such preferred mixing clear:

TABLE 7

| Ingredient # | Pounds | Gallons | Description |
|---|---|---|---|
| 1 | 49.6 | 6.5 | NeoRez R-966 |
| 2 | 13.9 | 1.7 | Deionized Water |
| 3 | 0.23 | — | 14% ammonia in Water |
| 4 | 0.87 | 0.10 | Diethylene glycol methyl ether |
| 5 | 0.12 | — | Surfynol 104E |
| 6 | 1.80 | 0.20 | Deionized Water |
| 7 | 0.94 | 0.10 | Acrysol TT615 Rheology Modifier |
| 8 | 11.5 | 1.4 | Deionized Water |

A preferred procedure for making this mixing clear is to premix #2 and #3 and then add to #1 with good agitation. Premix #4 and #5 and add to the batch. Add #6 to #7 and add to the batch. Add #8 to adjust viscosity to about 2500 cps using a Brookfield LVT #3 spindle at 30 rpm.

Using the above Tables 1 through 7 as representative examples of preferred toners and mixing clears, one can formulate waterborne basecoats having acceptability for use in either OEM or VR applications. By way of example the following teal-colored metallic basecoat can be formulated having particular utility in a vehicle refinish application:

TABLE 8

| Ingredient | Grams |
| --- | --- |
| Mixing Clear from Table 6 | 276.8 |
| Blue Mica Toner from Table 5 | 226.0 |
| Green Flop Blue Nonmetallic Toner from Table 2 | 159.6 |
| Blue Shade Green Nonmetallic Toner (similar procedure to Tables 1 and 2 with diff. pigment) | 88.1 |
| Aluminum Metallic Toner from Table 4 | 69.3 |
| Deionized Water | 156.8 |

The above basecoat has a VOC of 2.20 pounds per gallon less water. It can be reduced to "ready-to-spray" viscosity with either water or a combination of water with aqueous cosolvent. Conventional siphon and/or HVLP spray guns are typically used for application purposes. Complete hiding is usually attained with two or three coats, depending on the color.

Optionally included in the basecoat just prior to spraying are ingredients which enhance or modify various performance characteristics of the coating. For example, ambient cure crosslinkers such as aromatic and aliphatic carbodiimide crosslinkers or Dixie Chemical's DCE 358 glycidyl ether of sorbitol epoxy crosslinker can be added. Also, highly crosslinked acrylic microgel particles such as those taught in U.S. Pat. No. 4,377,661 can be added for rheology control. Furthermore, commercially available polyethylene wax dispersions such as Aquacer 840 available from Byk Chemie can be added for metal pigment control, if desired. Other additives are likewise available and suitable for use herein.

Primer/Basecoat/Clearcoat Combinations

The compositions of this invention are particularly well suited for use in multilayer decorative and protective coatings and composite coatings as the first layer or basecoat layer over which a second layer or clearcoat layer is applied.

The basecoat compositions of this invention are specifically formulated to be compatible with commercially existing and available primers, sealers, surfacers and clearcoats. In addition to chemical compatibility, overall VOC compliance of the entire system is the driving force in determining which compositions to use both under and over the present basecoats. For example, the following combinations of commercially available compositions from The Sherwin-Williams Company, Cleveland, Ohio USA with the basecoat composition of this invention (compositions disclosed above which are preferred for use in vehicle refinish applications) would be expected to be compatible and in compliance with current California VOC regulations:

Primer-Surfacers:
  Sherwin-Williams Aqua-Fill™One Component Primer (Product Number W7-A2250)
  or Sherwin-Williams Aqua II™ Two Component Epoxy (Product Numbers W8-A2500 and V6-W2503)
Primer-Sealers:
  Sherwin-Williams Sunfire™ Urethane Primer (Product Number E2-A820)
  or Sherwin-Williams Aqua II™ Two Component Epoxy (Product Numbers W8-2500 and V6-W2501)

Clearcoats
  Sherwin-Williams Ultra 7000™ Clearcoat (Booth Bake) (Product Number CC-835)
  or Sherwin-Williams Ultra 7000™ Clearcoat (Air Dry) (Product Number CC-830)

What is claimed is:

1. An aqueous coating composition comprising:
  a. a clear dispersion comprising:
    i. a polyurethane resin, dispersible in water, based on an aliphatic polyether;
    ii. water;
  b. at least one pigmented dispersion comprising:
    i. a polyurethane resin, dispersible in water, based on an aliphatic polyether;
    ii. a hydroxy-functional resin consisting essentially of the reaction product of:
      (1) 5–15% by weight methyl methacrylate:
      (2) 5–15% by weight styrene;
      (3) 10–20% butyl acrylate;
      (4) 35–45% butyl methacrylate;
      (5) 10–20% by weight hydroxy ethyl methacrylate;
      (6) 5–10% by weight acrylic acid;
        wherein the percentages by weight are based on the total weight of the hydroxy-functional resin;
    iii. at least one pigment; and
    iv. water.

2. The aqeuous coating composition of claim 1 further comprising a crosslinking agent.

3. A multi-layer composite coating composition which comprises:
  a. a first coat which comprises:
    i. a clear dispersion comprising:
      (1) a polyolethane resin dispersible in water, based on an aliphatic polyether;
      (2) water;
    ii. at least one pigmented dispersion comprising:
      (1) a polyurethane resin, dispersible in water, based on an aliphatic polyether;
      (2) hydroxy-functional resin consisting essentially of the reaction product of:
        (a) 5–15% by weight methyl methacrylate;
        (b) 5–15% by weight styrene;
        (c) 10–20% butyl acrylate;
        (d) 35–45% butyl methacrylate;
        (e) 10–20% by weight hydroxy ethyl methacrylate;
        (f) 5–10% by weight acrylic acid;
          wherein the percentages by weight are based on the total weight of the hydroxy-functional resin;
      (3) at least one pigment; and
      (4) water.
  b. a second coat which is applied to the surface of the first coat.

4. The multi-layer composite of claim 3 wherein the first coat further comprises a crosslinking agent.

5. In a substrate coated with a multi-layer decorative and/or protective coating which comprises:
  a. optionally, a primer coating applied directly to the substrate;
  b. at lease one basecoat layer applied to the printer or directly to the substrate; and
  c. a clearcoat layer which is applied to the surface of the basecoat layer prior to complete cure of said basecoat layer;
    the improvement which comprises utilizing as the basecoat layer a basecoat composition which comprises:

(i) a clear dispersion comprising:
  (a) a polyurethane resin, dispersible in water, based on an aliphatic polyether;
  (b) water;
(ii) at least one pigmented dispersion comprising:
  (a) a polyurethane resin, dispersible in water, based on an aliphatic polyether;
  (b) a hydroxy-functional resin consisting essentially of the reaction product of:
    (1) 5–15% by weight methyl methacrylate;
    (2) 5–15% by weight styrene;
    (3) 10–20% butyl acrylate;
    (4) 35–45% butyl methacrylate;
    (5) 10–20% by weight hydroxy ethyl methacrylate;
    (6) 5–10% by weight acrylic acid;
    wherein the percentages by weight are based on the total weight of the hydroxy-functional resin;
  (c) at least one pigment; and
  (d) water.

6. The substrate of claim 5 wherein the basecoat further comprises a crosslinking agent.

7. A process for coating a substrate with a multi-layer decorative and/or protective coating which process comprises:
 a. applying to the substrate at least one first coat which comprises;
  (i) a clear dispersion comprising:
    (a) a polyurethane resin, dispersible in water, based on an aliphatic polyether;
    (b) water;
  (ii) at least one pigmented dispersion comprising:
    (a) a polyurethane resin, dispersible in water, based on an aliphatic polyether;
    (b) a hydroxy-functional resin consisting essentially of the reaction product of:
      (1) 5–15% by weight methyl methacrylate;
      (2) 5–15% by weight styrene;
      (3) 10–20% butyl acrylate;
      (4) 35–45% butyl methacrylate;
      (5) 10–20% by weight hydroxy ethyl methacrylate;
      (6) 5–10% by weight acrylic acid;
      wherein the percentages by weight are based on the total weight of the hydroxy-functional resin;
    (c) at least one pigment; and
    (d) water
 b. applying to the surface of the first coat a second coat.

8. The process of claim 7 wherein said first coat further comprises a crosslinking agent.

9. The composition of claim 1 wherein the polyurethane resin dispersible in water comprises the reaction product of isophorone diisocyanate, polytetrahydrofuran, and dimethylolpropionic acid.

10. The composite coating composition of claim 3 wherein the polyurethane resin dispersible in water comprises the reaction product of isophorone diisocyanate, polytetrahydrofuran, and dimethylolpropionic acid.

11. The composition of claim 5 wherein the polyurethane resin dispersible in water comprises the reaction product of isophorone diisocyanate, polytetrahydrofuran, and dimethylolpropionic acid.

12. The process of claim 7 wherein the polyurethane resin dispersible in water comprises the reaction product of isophorone diisocyanate, polytetrahydrofuran, and dimethylolpropionic acid.

* * * * *